(12) United States Patent
Alt et al.

(10) Patent No.: US 7,732,008 B2
(45) Date of Patent: Jun. 8, 2010

(54) PROCESS FOR THE PRODUCTION OR COATING OF GRANULES, APPARATUS FOR CARRYING OUT THE PROCESS, AND GRANULES OBTAINABLE THEREBY

(75) Inventors: Hans Christian Alt, Gelnhausen (DE); Andreas Harthun, Moembris (DE); Joachim Luethi, Koenigswinter (DE); Andreas Goelz, Rodenbach (DE); Stefan Schulze, Grobkrotzenburg (DE); Martin Wille, Frankfurt (DE)

(73) Assignee: Evonik Degussa GmbH, Essen (DE)

( * ) Notice: Subject to any disclaimer, the term of this patent is extended or adjusted under 35 U.S.C. 154(b) by 1510 days.

(21) Appl. No.: 10/270,116

(22) Filed: Oct. 15, 2002

(65) Prior Publication Data

US 2003/0091737 A1    May 15, 2003

(30) Foreign Application Priority Data

Oct. 15, 2001    (DE) ................................ 101 50 325

(51) Int. Cl.
    *B05D 7/00*    (2006.01)
(52) U.S. Cl. ................. 427/213; 427/213.3; 427/213.31
(58) Field of Classification Search ................. 427/213, 427/213.3, 213.31, 213.36; 34/359, 373, 34/372
    See application file for complete search history.

(56) References Cited

U.S. PATENT DOCUMENTS

| | | | | |
|---|---|---|---|---|
| 3,251,428 A | * | 5/1966 | Tabler | 427/213 |
| 4,145,818 A | * | 3/1979 | Kulling | 34/364 |
| 4,218,345 A | * | 8/1980 | Hoff et al. | 502/242 |
| 4,621,437 A | | 11/1986 | Grande et al. | 34/361 |
| 4,719,008 A | * | 1/1988 | Sparks et al. | 208/390 |
| 5,628,800 A | | 5/1997 | Schlicht et al. | 23/313 FB |
| 5,632,102 A | | 5/1997 | Luy et al. | 34/582 |
| 2001/0005514 A1 | * | 6/2001 | Chen et al. | 424/736 |
| 2003/0088994 A1 | * | 5/2003 | Luethi et al. | 34/359 |

FOREIGN PATENT DOCUMENTS

DE    197 04 180    8/1998

OTHER PUBLICATIONS

H. Uhlemann, Chem.-Ing.-Tech. vol. 62, nr. 10. pp. 822-834, "Kontinuierliche Wirbelschicht-Sprühgranulation", 1990.
K. Ruempler, Chemische Produktion, pp. 18-21, "Granulattrocknung in Der Wirbelschicht", Jun. 1992.

(Continued)

*Primary Examiner*—Elena T Lightfoot
(74) *Attorney, Agent, or Firm*—Oblon, Spivak, McClelland, Maier & Neustadt, L.L.P.

(57) ABSTRACT

A process for the production or coating of granules in a fluidized bed, which includes heating a fluidized-bed gas to produce the fluidized bed, and applying a liquid medium containing a granule-forming or coating-forming compound, or at least one reaction component therefore, by spraying particles located in the fluidized bed and at a same time vaporizing an organic solvent contained in the liquid medium, said particles having a smaller mean diameter than that of particles to be produced. The process also includes partial condensation of an organic solvent from at least a portion of a fluidized-bed waste gas leaving the fluidized bed, and re-heating the fluidized bed-gas leaving the condensation device and reintroducing the re-heated gas into the fluidized bed.

11 Claims, 1 Drawing Sheet

OTHER PUBLICATIONS

U.S. Appl. No. 10/935,595, filed Sep. 8, 2004, Harthun, et al.
U.S. Appl. No. 10/270,113, filed Oct. 15, 2002, Luethi, et al.
U.S. Appl. No. 10/270,114, filed Oct. 15, 2002, Harthun, et al.

* cited by examiner

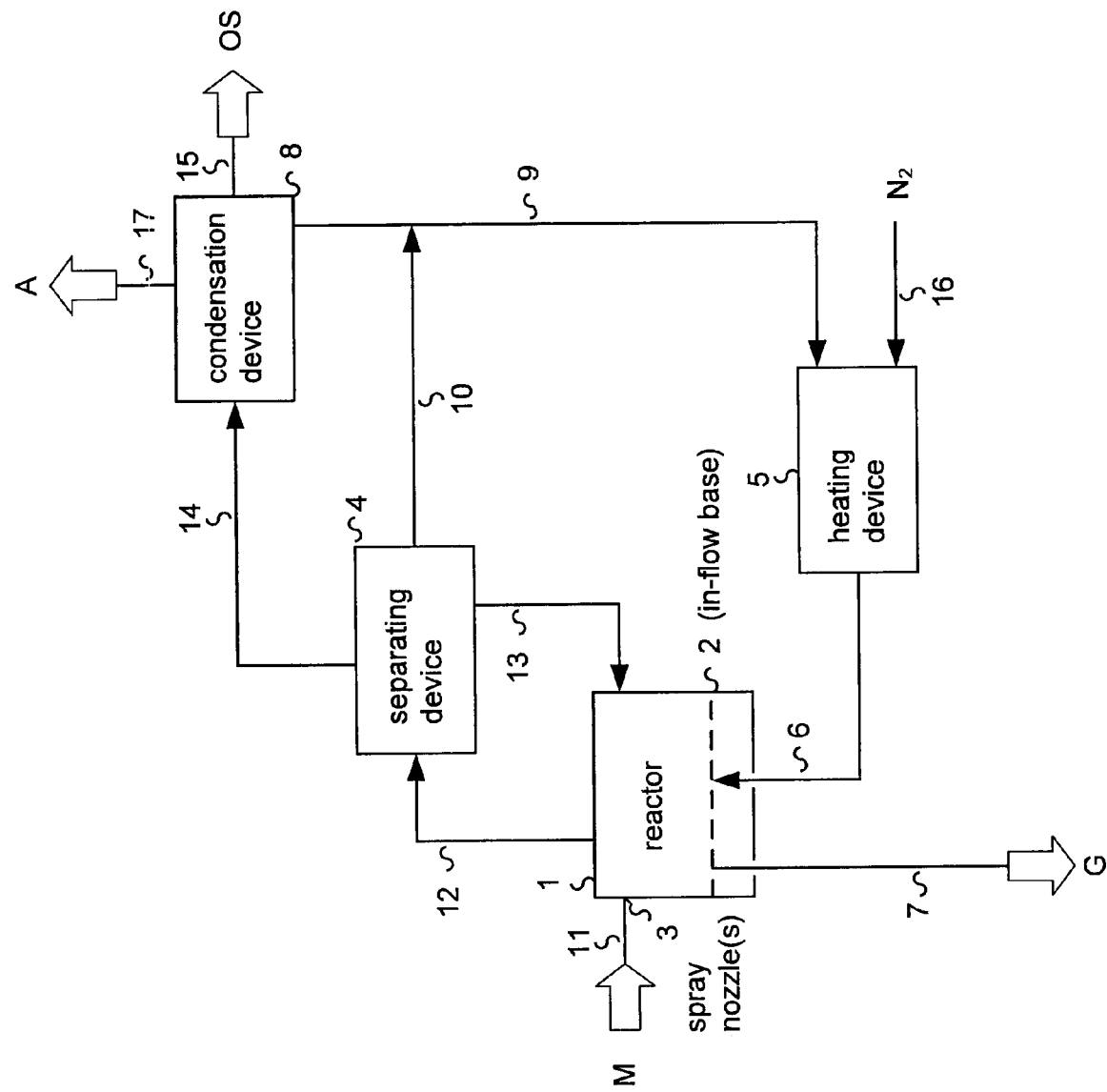

PROCESS FOR THE PRODUCTION OR COATING OF GRANULES, APPARATUS FOR CARRYING OUT THE PROCESS, AND GRANULES OBTAINABLE THEREBY

BACKGROUND OF THE INVENTION

1. Field of the Invention

The present invention is directed towards a process for the production or coating of granules in a fluidized bed, in which a liquid medium containing a granule- or coating-forming compound or at least one reaction component therefore is applied by spraying particles located in the fluidized bed and having a smaller mean diameter than that of the particles to be produced, and at the same time solvent contained in the medium is vaporized. The process is directed in particular towards the production of organic or inorganic granules, as well as towards the coating of granules with an organic or inorganic coating material. The present invention is also directed towards an apparatus for performing the process according to the present invention, including a fluidized-bed spray granulation installation with which organic solutions or suspensions can be handled safely. The present invention also provides granules obtainable by the process having a substantially spherical habit, and coated granules. The granules or the coating include one or more organic or inorganic compounds.

2. Discussion of the Background

Ever higher demands are being made by the markets on chemical products in the form of solids in respect of their bulk properties. For example, the products that are produced should be dust-free and readily pourable, as well as having a narrow particle size distribution and as high a bulk density as possible.

Although virtually spherical and hence readily pourable particles can be produced by known spray-drying processes, such particles are hollow spheres having a low density and an undesirable tendency to form dust. Fluidized-bed spray granulation, on the other hand, permits the production of approximately spherical solid particles.

An overview of known processes and apparatuses for fluidized-bed spray granulation is given by Hans Uhlemann, Chem.-Ing.-Tech.62 (1990), pages 822-834. Fundamental features of fluidized-bed spray granulation are the formation of a stable fluidized bed inside a granulator (=reactor), the application of the liquid medium, which contains granule-forming material in the form of a solution, suspension or melt to the particles of the fluidized bed by spraying, and the vaporization of the solvent contained in the liquid medium, which takes place at the same time. During fluidized-bed spray granulation, the particles grow and particles of the desired target grain size are separated from the fluidized bed in a suitable manner. Fine particles separated off with the fluidized-bed gas are recycled into the process in a suitable manner. Uhlemann teaches different process variants, measures for injecting a liquid medium into the fluidized bed, for removing dust from the outgoing air and for controlling the moisture content and size of the granules. In all the embodiments of Uhlemann, heated air is always used as the fluidized-bed gas, which serves the purpose of fluidisation and at the same time is the energy carrier. There is no indication in the Uhlemann document that the liquid medium to be sprayed into the fluidized-bed reactor is an organic solution, or as to how resulting safety problems can be overcome.

In the fields of application for fluidized-bed spray granulation mentioned by Uhlemann, aqueous solutions or suspensions are evidently always used as the medium to be sprayed into the reactor.

Chemische Produktion 6/92, pages 18-21 demonstrates the principle of action of a continuous fluidized-bed granulation drier which is suitable, as well as for drying, for the agglomeration of pulverulent substances, for the coating of disperse granular substances, as well as for carrying out chemical reactions between solid and fluid phases. In general, hot air, but also hot gas, is fed to the drier as the drying medium via a specially designed in-flow base. To intensify the transfer of heat, during circulating-air operation a portion of the outgoing air can be fed back to the heat exchanger as circulating air and is available to the reactor again as the drying medium. According to an alternative embodiment, the outgoing air leaving a fluidized-bed spray granulator is used to pre-heat fresh air used as the drying medium. This document also makes no reference to the use of organic solutions as the liquid medium to be sprayed, nor does it give any indication as to which other hot gas should be used instead of hot air and how the risk of the formation of explosive solvent vapours can be avoided without too great a technical outlay.

According to DE patent specification 197 04 180, alkali cyanide granules are produced from a HCN-containing gas and an aqueous solution of an alkali hydroxide in a fluidized bed. Instead of air, with which HCN explosive mixtures would form, nitrogen or superheated steam is used as the fluidizing gas.

To the knowledge of the inventors of the present invention, no industrial process is as yet known according to which the fluidized-bed spray granulation process has been used to produce bulk materials that have been produced using solutions or suspensions in an organic solvent that forms explosive vapours with air. The use of organic solutions is therefore a hurdle in terms of process technology and safety technology when performing a fluidized-bed spray granulation process. To avoid the formation of explosive vapours of air with the organic solvent, a person skilled in the art could use nitrogen instead of air as the fluidized-bed gas in the generic process. Such a procedure would not be very economical, however, because of the expensive fluidized-bed gas and additional necessary precautions for recovering the organic solvent from the waste gas.

SUMMARY OF THE INVENTION

An object of the present invention is accordingly to provide a process which is safe and economical to perform, in which a liquid medium is used that contains an organic solvent and by which substantially spherical solid granules can be produced or granules can be coated with a coating material. The process should additionally permit recovery of the organic solvent and be capable of being implemented with as little waste gas as possible.

Another object of the present invention is directed to an apparatus for the production and coating of granules in a fluidized bed, which can be operated safely and in which a liquid medium containing an organic solvent is used.

Yet another object is directed towards the provision of substantially spherical solid organic or inorganic granules or of granules coated with an organic or inorganic material.

To achieve these and other objects, the present invention provides a process for the production or coating of granules in a fluidized bed, which includes heating a fluidized-bed gas to produce the fluidized bed, and applying a liquid medium containing a granule-forming or coating-forming compound, or at least one reaction component therefore, by spraying particles located in the fluidized bed and at a same time vaporizing an organic solvent contained in the liquid medium, said particles having a smaller mean diameter than that of particles to be produced. The process also includes partial condensation of an organic solvent from at least a portion of a fluidized-bed waste gas leaving the fluidized bed, and re-heating the fluidized-bed gas leaving the condensation device and reintroducing the re-heated gas into the fluidized bed.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings wherein:

FIG. 1 illustrates a diagram of a fluidized-bed spray granulation apparatus for performing the process of the present invention.

DESCRIPTION OF THE PREFERRED EMBODIMENTS

According to the present invention, the medium to be sprayed contains an organic solvent that vaporizes under the operating conditions of the fluidized bed and thus permits the formation of the granules or the coating of the granules. The organic solvents of the liquid medium are preferably solvents having a boiling point below approximately 200° C., and preferably below 150° C. They are particularly preferably solvents such as alcohols having from 1 to 8 carbon atoms, ketones having from 3 to 8 carbon atoms, as well as aliphatic, cycloaliphatic, aromatic-aliphatic and aromatic hydrocarbons. Such solvents are used within the scope of the preparation of many organic and inorganic substances, so that the substances dissolved in such a solvent can be converted directly into granules or used to form a coating layer on granules obtained by other means.

According to a further feature of the present invention, the fluidized-bed gas contains an organic solvent. Other constituents of the fluidized-bed gas should be inert towards the solvent, that is should not form explosive vapours. Accordingly, the fluidized-bed gas is preferably free of air or oxygen, or at least the content of air or oxygen under the conditions occurring during operation is below the explosive limit. According to a preferred embodiment of the process of the present invention, the fluidized-bed gas is a mixture of an organic solvent and nitrogen. According to a particularly preferred embodiment of the process of the present invention, a fluidized-bed gas having a nitrogen content that is as low as possible is used. The organic solvent contained in the fluidized-bed gas is advantageously the same solvent as that contained in the liquid medium.

As a result of the vaporization of the organic solvent introduced into the system with the liquid medium, the solvent content in the fluidized-bed gas leaving the fluidized bed, referred to hereinbelow as the fluidized-bed waste gas, is higher than in the fluidized-bed gas used as a drying medium. According to a further feature of the present invention, therefore, at least a portion of the fluidized-bed waste gas leaving the fluidized bed is depleted of organic solvent in a device for partial condensation of the solvent, and the depleted gas is used again as the fluidized-bed gas after being re-heated. According to a preferred embodiment, the aim is to achieve a circulating gas system that is as complete as possible, and the organic solvent introduced with the liquid medium is removed substantially completely, preferably from a partial stream of the fluidized-bed waste gas by partial or substantially complete condensation.

When performing the process according to the present invention for the production or coating of granules, there is advantageously used as the fluidized-bed gas an inert gas that does not form an explosive mixture with the constituents of the medium under the operating conditions, therefore especially nitrogen, and the amount of inert gas is reduced during operation. In this circulating gas procedure, therefore, the inert gas used is replaced stepwise by superheated vapour of the organic solvent. After a time, an equilibrium composition of the fluidized-bed gas is established. The amount of inert gas in that equilibrium composition is determined by the amount of inert gas additionally introduced.

The inert gas additionally introduced may be the inert gas with which the spray nozzles are charged for spraying the liquid medium. The feeding in of further inert gases in the course of the process is preferably avoided, so that in stationary operation the fluidized-bed gas for the granulation and drying includes essentially of superheated vapour of the solvent. Recovery of the solvent is effected solely by condensation in a moderate temperature range. In contrast to the inert gas procedure, in which a very low temperature is required for condensation of the solvent and which leads to a residual organic solvent content in the inert gas, it is sufficient in the case of the preferred procedure according to the present invention for the solvent vapours of the fluidized-bed waste gas to be cooled below the condensation point. After-treatment of the solvent-containing waste gas is completely unnecessary in the case of this procedure. By the procedure according to the present invention using superheated solvent vapour as the fluidized-bed gas, the consumption of expensive oxygen-free inert gases can be reduced to a minimum, which arises from the startup phase, without the safety of the installation being decreased.

Spraying of the liquid medium is effected by conventional single- or multi-component nozzles. They may be in the form of pressure nozzles or pneumatic atomisers. In the case of single- or multi-component pressure nozzles, the pressurized solution or suspension of the substance that is to be granulated or that forms a coating layer, or at least one reaction substance therefore, is sprayed. If, on the other hand, pneumatic atomisers are used, the liquid medium is sprayed additionally by an atomizing gas. The atomizing gas may be an inert gas and/or superheated vapour of the organic solvent present in the circulating gas process. In the case of the circulating gas operation, a partial stream of the circulating gas is preferably used as the atomizing gas. The person skilled in the art will optimize the form of the atomiser nozzles and their arrangement within the fluidized-bed reactor by experimentation.

Further, it is possible to spray the liquid medium onto the fluidized bed from above, into the fluidized bed from nozzles arranged inside the fluidized bed on the reactor wall, as well as into the fluidized bed from bottom to top from nozzles arranged in the vicinity of the in-flow base of the fluidized-bed reactor.

Fine solids particles are usually discharged from the fluidized bed with the fluidized-bed waste gas. Such solids particles are separated from the waste gas in a manner known per se in a solid/gas separating device, for example in a cyclone or a surface filter with pressure-pulse cleaning. The solids particles so separated off can either be fed directly to the fluidized-bed reactor for controlling the nucleus count or, after dissolution in the liquid medium to be sprayed, can be recycled.

It is known to the person skilled in the art that to maintain a stationary operating state and obtain a desired particle spectrum the nucleus count must be maintained in a suitable manner. Suitable measures therefore are known from the mentioned Uhlemann document.

A partial stream of granules is removed continuously or discontinuously from the granulation fluidized bed in a manner known per se—see the Uhlemann document—, optionally cooled and, if required, stored under a protecting gas atmosphere. The granulation, and hence also the removal of granules, may also be performed batchwise, although that is less advantageous from an economical point of view. Depending on the desired particle spectrum of the granules produced according to the present invention, the granules can be discharged from the fluidized-bed reactor in a conventional discharge apparatus with or without an integrated screening device. Where a screening device is provided downstream, the fines are recycled into the fluidized bed, if necessary. It is particularly preferred for particles having a size within the desired particle spectrum to be discharged continuously from the reactor in such a manner that the mass contained therein remains constant.

In addition, the fluidized-bed spray granulation according to the present invention can be performed at an elevated pressure, normal pressure or reduced pressure. An advantageous process pressure range is present when granules in accordance with the specification are produced at maximum capacity with the fluidized-bed gas at the maximum permissible system temperature. To avoid the penetration of air into the system, the installation is preferably operated at normal pressure or slightly elevated pressure, approximately an elevated pressure up to 200 mbar above ambient pressure. The fluidized-bed gas to be used according to the present invention can be brought to the required temperature electrically or by a heat-transfer medium, such as steam, in conventional heat exchangers. For the economical operation of a fluidized-bed spray granulation installation, a combination of the two mentioned types of gas heating may be advantageous.

By the process according to the present invention it is possible to produce substantially spherical and dense granular solids from solutions or suspensions containing organic solvents. The mean values of the particle size distributions produced are in a range of generally from greater than 100 µm to less than 30 mm in the case of conventional fluidized-bed spray granulation.

According to a particular embodiment, which is desirable especially when particles having a mean particle diameter less than 100 µm are to be produced, the fluidized-bed spray granulation takes place using a so-called circulating fluidized bed. In such a procedure, the speed of the fluidized-bed gas is increased as compared with stationary fluidized-bed operation in such a manner that particles are discharged from the fluidized-bed reactor with the gas stream and after being separated from the waste gas stream are fed back into the fluidized-bed reactor again, it being necessary to ensure that the mass of material within the circulating fluidized bed is sufficiently great so there is a high probability of spray droplets coming into contact with the circulating particles, and so that the particles are able to grow. In this embodiment, therefore, the fluidized bed is transported pneumatically within the fluidized-bed reactor.

In the process according to the present invention for applying a coating layer to granule particles, the granule particles, which can be produced beforehand by any desired method, are sprayed in a fluidized bed with a solution or suspension of the coating material in an organic solvent. By coating the granules, whereby the layer thickness may be only a few atomic layers of the layer material or from a few µm to 100 µm or more, it is possible to change the properties of the granules, for example the storage stability, the storability in silos, the flowability, the rate of dissolution and the tolerability with other substances of a mixture of granules.

The present invention also provides an apparatus, as shown in FIG. 1, for the production or coating of granules in a fluidized bed. The apparatus includes a fluidized-bed reactor 1 having an in-flow base 2 for a heated fluidized-bed gas, at least one spray nozzle 3 for spraying a liquid medium into the reactor, a solid/gas separating device 4 for separating solids particles from the fluidized-bed waste gas, a heating device 5 for heating the fluidized-bed gas fed to the reactor, and a discharging device 7 for discharging granules from the reactor. Also included is a condensation device 8 for the condensation of organic solvent from at least one partial stream of the fluidized-bed waste gas freed of solids particles, and a circulating pipe 9 from the condensation device 8 to the heater 5.

The solid/gas separating device 4 is for dust separation 4, the condensation device 8 is for the condensation of at least part of the organic solvent contained in at least one partial stream of the fluidized-bed waste gas 8, and the heating device 5 is for heating the fluidized-bed gas. As shown, the fluidized-bed reactor 1 contains in its lower portion the in-flow base 2, through which the fluidized-bed gas introduced by a pipe 6 into the lowermost portion of the reactor flows in a manner distributed uniformly over the in-flow base, to keep the particulate material located in the reactor in a stationary or in a circulating fluidized bed.

Arranged inside the fluidized-bed reactor 1 are the one or more spray nozzles 3, through which the liquid medium M is fed by a pipe 11. The reactor 1 includes the discharging device 7 for discharging the granules G, shown as a simple pipe 7 in FIG. 1. The reactor 1 may be constructed in a known manner, for example in the form of a circular reactor or a flow trough.

For a circular construction, the actual granulation chamber of the fluidized-bed reactor 1 is generally in cylindrical form in the lower portion, the ratio of diameter to height usually being in the range from 1:1 to 1:5, preferably 1:2.5. Adjacent to the cylindrical portion, in which the fluidized bed is substantially located, is the expansion chamber, whose diameter increases towards the top. In the case of a reactor in the form of a flow trough too, the fluidized bed is located in a lower portion having vertical walls, adjacent to which is an upper, widening portion as the expansion chamber. At the upper end of the granulation chamber, the fluidized-bed gas is passed by a pipe 12 into the separating device 4 for solid/gas separation, in which fine particles (dust) are separated out. The separating device 4 is a known apparatus, such as a waste air filter or a cyclone. If required, one or more separating cyclones are connected in series, optionally followed by a waste air filter. The solids separators are provided with one or more solids return pipes 13, through which the dust is fed back into the fluidized-bed reactor again. For the pneumatic closing of the solids separator(s)—such an embodiment is required particularly when a fluidized-bed reactor having a circulating fluidized bed—conventional apparatuses, such as star wheel feeders, are used.

At least part of the fluidized-bed waste gas freed of solids is fed by a pipe 14 into the condensation device 8 for condensation of the organic solvent contained in the waste gas. In the condensation device 8, at least some of the organic solvent is condensed by a cooling medium. The condensed organic solvent OS is discharged by a pipe 15. For the circulating gas operation, the residual gas from the condensation device is fed by the pipe 9 to a device for heating the fluidized-bed gas. The latter passes from there by the pipe 6 into a chamber arranged beneath the in-flow base, which enables the fluidized-bed gas to flow uniformly over the entire cross-section of the fluidized-bed reactor.

The heating device 4 gas may be in any desired form. For example, the gas can be heated electrically and/or by a suitable heating medium in a heat exchanger. When starting up the apparatus according to the present invention in particular, nitrogen $N_2$ is used as the fluidized-bed gas and is passed by a pipe 16 to the heating device 5 for heating the fluidized-bed gas. In the start-up phase, the excess waste gas A is discharged from the cyclic process by a pipe 17. According to a preferred embodiment, namely the circulating gas operation, a portion of the fluidized-bed waste gas freed of dust is passed by a pipe 10 directly into the circulating pipe 9.

From the fluidized bed reactor 1, the resulting granules are removed from the fluidized-bed chamber continuously or periodically by a suitable outlet device—which is shown in the form of the simple outlet pipe 7 in FIG. 1. The outlet device is advantageously a conventional sifter. There may be used as the sifter gas an inert gas or, preferably, superheated circulating gas, that is especially superheated solvent requirement.

Using the above-described apparatus for performing the process according to the present invention with a cyclic procedure, waste gases must be discharged only in the start-up phase. The fluidized-bed waste gas partial stream, which is guided by the condensation device, is treated in such a manner that the discharged waste gas does not contain a relatively large amount of solvent vapour. In a stationary operation without the supply of fresh inert gases, no waste gas for discharge is formed, and the condensation can take place at a moderate temperature level. The division of the fluidized-bed waste gas partial streams, which are fed on the one hand by the condensation device and on the other hand directly to the device for heating the fluidized-bed gas, is controlled in such a way that, once the installation has been brought into operation, the organic solvent introduced with the liquid medium is condensed completely and discharged from the circuit. If a different inert gas, such as nitrogen, is used instead of the superheated fluidized-bed gas for spraying the liquid medium, that amount is formed as waste gas A and is discharged from the process.

The present invention also provides granules based on one or more organic or inorganic compounds having a substantially spherical habit and a dense structure. The granules may be substances that are already contained as such in dissolved or suspended form in a liquid medium that is to be sprayed or they can be formed from two or more starting materials, at least one of which is contained in the liquid medium. A further reaction component can also be introduced in gaseous form. According to the present invention it is also possible to produce organic and inorganic granules containing constituents that are compatible with one another in the solid state but not, or unsatisfactorily, in the form of a single solution.

Granules coated according to the present invention contain a core, which can have been produced by any desired method, and a coating of one or more organic and inorganic compounds which has been applied to the core by fluidized-bed spray granulation according to the present invention. The coating is in the form of a dense, firmly adhering layer on the core.

The process according to the present invention can be used, for example, to produce alkali alcoholate and alkaline earth alcoholate granules of aliphatic, saturated or unsaturated, unbranched or branched alcohols having from 1 to 12, especially from 1 to 6, carbon atoms. The process is especially suitable for the production of granules of sodium methoxide, sodium ethoxide, potassium methoxide and potassium ethoxide. In such cases, an alcoholic solution of the appropriate alkali metal alcoholate having a preferred alcoholate content in the range from 20 to 30 wt. % is sprayed into a fluidized bed containing the alcoholate to be prepared. The fluidized-bed temperature is adjusted to from 70 to 95° C. by passing through the fluidized bed a fluidized-bed gas having a temperature of approximately from 150 to 250° C., which gas is the superheated alcohol and, if required, additionally nitrogen. The alcohol that is introduced with the alcohol solution and passes into the fluidized-bed waste gas as a result of the drying process is condensed in the condensation device and discharged from the circulating gas system.

The process according to the present invention can also be used for coating pharmaceutical products as well as for the production and coating of products of the foodstuffs and animal feeds industry.

Obviously, numerous modifications and variations of the present invention are possible in light of the above teachings. It is therefore to be understood that within the scope of the appended claims, the invention may be practiced otherwise than as specifically described herein.

The invention claimed is:

1. A process for the production or coating of granules in a fluidized bed, comprising:
   heating a fluidized-bed gas to produce the fluidized bed, wherein the fluidized-bed gas comprises an inert gas that does not form an explosive mixture with constituents of the liquid medium;
   applying a liquid medium comprising a granule-forming or coating-forming compound, or at least one reaction component therefore, by spraying particles located in the fluidized bed and at a same time vaporizing an organic solvent comprised in the liquid medium, said particles having a smaller mean diameter than that of particles to be produced, wherein an amount of inert gas is reduced during operation and replaced by a superheated vapor of the organic solvent;
   partially condensating an organic solvent from at least a portion of a fluidized-bed waste gas leaving the fluidized bed; and
   re-heating the fluidized-bed gas leaving the condensation device and reintroducing the re-heated gas into the fluidized bed.

2. The process according to claim 1, further comprising:
   separating solids particles discharged from the fluidized bed with the fluidized-bed waste gas in a single- or multi-step gas/solid separating device; and feeding-back the separated solids particles at least partially into the fluidized bed in at least one of in the form of the solids particles or in the form of an organic solution thereof.

3. The process according to claims 1, wherein formation of the granules is performed in a circulating fluidized bed, and a rate of flow of the fluidized-bed gas is above a limit value at which a transition from a stable fluidized bed to pneumatic transport takes place.

4. The process according to claim 1, wherein the liquid medium is sprayed by one or more single- or multi-component nozzles arranged inside the fluidized bed.

5. The process according to claim 1, wherein granules having a predetermined mean diameter are discharged from the fluidized bed continuously or periodically by a discharge device with or without a screening device.

6. The process according to claim 1, wherein for stationary operation of the fluidized bed, a heated fluidized-bed gas comprising predominantly solvent vapor of the organic solvent comprised in the medium is used, and substantially no solvent-laden waste gas to be discharged from the cyclic process is formed.

7. One or more granules and one or more coated granules comprising one or more organic or inorganic compounds having a substantially spherical habit and a dense structure, obtained by a process according to any one of claims 1 and 2-6.

8. The process according to claim 1, wherein said process is carried out at pressures up to 200 mbar above ambient pressure.

9. The process according to claim 1, wherein said amount of inert gas is reduced during said start-up phase.

10. The process according to claim 1, wherein said amount of inert gas is reduced during said start-up phase by step-wise replacing the inert gas with superheated vapor of the organic solvent.

11. The process according to claim 1, wherein said amount of inert gas is reduced by step-wise replacing the inert gas with superheated vapor of the organic solvent.

* * * * *